US012705492B2

(12) United States Patent
Yeo et al.

(10) Patent No.: US 12,705,492 B2
(45) Date of Patent: Aug. 11, 2026

(54) UNSUPERVISED ANOMALY DETECTION OF INDUSTRIAL DYNAMIC SYSTEMS WITH CONTRASTIVE LATENT DENSITY LEARNING

(71) Applicant: International Business Machines Corporation, Armonk, NY (US)

(72) Inventors: Kyong Min Yeo, Scarsdale, NY (US); Tsuyoshi Ide, Harrison, NY (US); Bhanukiran Vinzamuri, Long Island City, NY (US); Wesley M. Gifford, Ridgefield, CT (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 17/587,589

(22) Filed: Jan. 28, 2022

(65) Prior Publication Data

US 2023/0244946 A1 Aug. 3, 2023

(51) Int. Cl.

*G06N 3/088* (2023.01)
*G06N 3/044* (2023.01)
*G06N 3/047* (2023.01)

(52) U.S. Cl.

CPC ............. *G06N 3/088* (2013.01); *G06N 3/044* (2023.01); *G06N 3/047* (2023.01)

(58) Field of Classification Search

CPC ......... G06N 3/088; G06N 3/047; G06N 3/044
See application file for complete search history.

(56) References Cited

U.S. PATENT DOCUMENTS

| | | | |
|---|---|---|---|
| 10,802,942 | B2 | 10/2020 | Agerstam et al. |
| 2014/0149806 | A1 | 5/2014 | Khalastchi et al. |

(Continued)

FOREIGN PATENT DOCUMENTS

| | | |
|---|---|---|
| CN | 108204892 A | 6/2018 |
| CN | 110213788 A | 9/2019 |

(Continued)

OTHER PUBLICATIONS

Yu et al. (Exploring the Intrinsic Probability Distribution for Hyperspectral Anomaly Detection, May 2021, pp. 1-12) (Year: 2021).*

(Continued)

*Primary Examiner* — George Giroux
(74) *Attorney, Agent, or Firm* — Scully, Scott, Murphy & Presser, P.C.; Michael O'Keefe

(57) ABSTRACT

Anomaly detection in industrial dynamic process can include receiving a set of multivariate time series data representative of sensor data obtained over time. The set of multivariate time series data can be transformed into a set of signature vectors in an embedding space. A neural network can be trained to estimate a probability distribution of the set of signature vectors in the embedding space. Streaming data can be received. The streaming data can be appended with a previously stored time series data. The appended streaming data can be transformed into an embedding. The embedding can be input into the trained neural network, the trained neural network outputting a first probability distribution score. A second probability distribution score associated with the embedding can be determined based on a given proposed probability distribution. Anomaly score can be determined based on the first probability distribution score and the second probability distribution score.

17 Claims, 10 Drawing Sheets

(56) References Cited

U.S. PATENT DOCUMENTS

| | | | |
|---|---|---|---|
| 2018/0096243 | A1 | 4/2018 | Patil et al. |
| 2019/0135300 | A1 | 5/2019 | Gonzalez Aguirre et al. |
| 2020/0067969 | A1 * | 2/2020 | Abbaszadeh ............ G06N 5/04 |
| 2020/0104224 | A1 | 4/2020 | Katou |
| 2020/0379454 | A1 * | 12/2020 | Trinh ................... G05B 23/024 |
| 2021/0012902 | A1 * | 1/2021 | Chawla ............ G06F 18/24133 |
| 2021/0103794 | A1 | 4/2021 | Jung |

FOREIGN PATENT DOCUMENTS

| | | | |
|---|---|---|---|
| CN | 110309886 | A | 10/2019 |
| CN | 110427320 | A | 11/2019 |
| CN | 113076215 | A | 7/2021 |
| CN | 113269096 | A | 8/2021 |
| FR | 3084742 | B1 | 8/2021 |
| WO | 2023/143190 | A1 | 8/2023 |

OTHER PUBLICATIONS

Xie et al. (Contrastive Learning for Sequential Recommendation, Feb. 2021, pp. 1-11) (Year: 2021).*

Gong et al. (Variational Selective Autoencoder: Learning from Partially-Observed Heterogeneous Data, Feb. 2021, pp. 1-10) (Year: 2021).*

Morrill et al. (A Generalized Signature Method for Multivariate Time Series Feature Extraction, Feb. 2021, pp. 1-22) (Year: 2021).*

Guguloth, N., et al., "On Practical Aspects of Using RNNs for Fault Detection in Sparsely-Labeled Multi-Sensor Time Series", 10th Annual Conference of the Prognostics and Health Management Society 2018, 10 pages.

NIST, "NIST Cloud Computing Program", http://csrc.nist.gov/groups/SNS/cloud-computing/index.html, Created Dec. 1, 2016, Updated Oct. 6, 2017, 9 pages.

International Search Report and Written Opinion dated Apr. 19, 2023 issued in PCT/CN2023/072398, 9 pages.

* cited by examiner

UNSUPERVISED ANOMALY DETECTION OF INDUSTRIAL DYNAMIC SYSTEMS WITH CONTRASTIVE LATENT DENSITY LEARNING

BACKGROUND

The present application relates generally to computers and computer applications, and more particularly to anomaly detection and machine learning.

Industrial dynamic systems can be monitored using signals or data received from various sensors coupled with operating equipment and/or chambers, which gauge various factors during industrial processes. By monitoring the sensor signals over time, e.g., time series data, anomaly during the operations may be detected. Challenges exist, however, as sensor signals can be highly noisy, and the data can be subject to changes in exogeneous factors such as operational conditions, seasonal change, and/or others. In such systems also, the number of failures can be very small, making it not appropriate to apply supervised machine learning or classification approaches. Further, precisely estimating probability density for noisy time-series data, which is a prerequisite for anomaly detection, can be challenging due to potentially high dimensionality.

BRIEF SUMMARY

The summary of the disclosure is given to aid understanding of a computer system and method of anomaly detection, for example, in industrial dynamic system, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A method of detecting anomaly in an industrial process, in an aspect, can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space.

In another aspect, a method of detecting anomaly in an industrial process can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space. The set of multivariate time series data can be transformed into the set of signature vectors by learning an embedding function using deep learning.

In yet another aspect, a method of detecting anomaly in an industrial process can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space. The neural network can be learned by contrasting random samples from the set of signature vectors with random samples from a given distribution and updating weights of the neural network using a loss function based on the contrasting.

In still another aspect, a method of detecting anomaly in an industrial process can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space. The method can also include receiving streaming data and based on the trained neural network, determining an anomaly score in the streaming data.

In another aspect, a method of detecting anomaly in an industrial process can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space. The method can also include receiving streaming data. The method can further include appending the streaming data with a previously stored time series data. The method can also include transforming the appended streaming data into an embedding. The method can further include inputting the embedding into the trained neural network, the trained neural network outputting a first probability distribution score. The method can further include determining a second probability distribution score associated with the embedding based on a given proposed probability distribution. The method can also include determining an anomaly score based on the first probability distribution score and the second probability distribution score.

In another aspect, a method of detecting anomaly in an industrial process can include receiving a set of multivariate time series data representative of sensor data obtained over time. The method can also include transforming the set of multivariate time series data into a set of signature vectors in an embedding space. The method can further include training a neural network to estimate a probability distribution of the set of signature vectors in the embedding space. The method can also include receiving streaming data. The method can further include appending the streaming data with a previously stored time series data. The method can also include transforming the appended streaming data into an embedding. The method can further include inputting the embedding into the trained neural network, the trained neural network outputting a first probability distribution score. The method can further include determining a second probability distribution score associated with the embedding based on a given proposed probability distribution. The method can also include determining an anomaly score based on the first probability distribution score and the second probability distribution score. The method can further include comparing the anomaly score with a given threshold value. The method can also include, based on the comparison of the anomaly score with the given threshold value, determining anomalousness of the streaming data.

A system including a processor can also be configured to perform one or more methods described herein. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
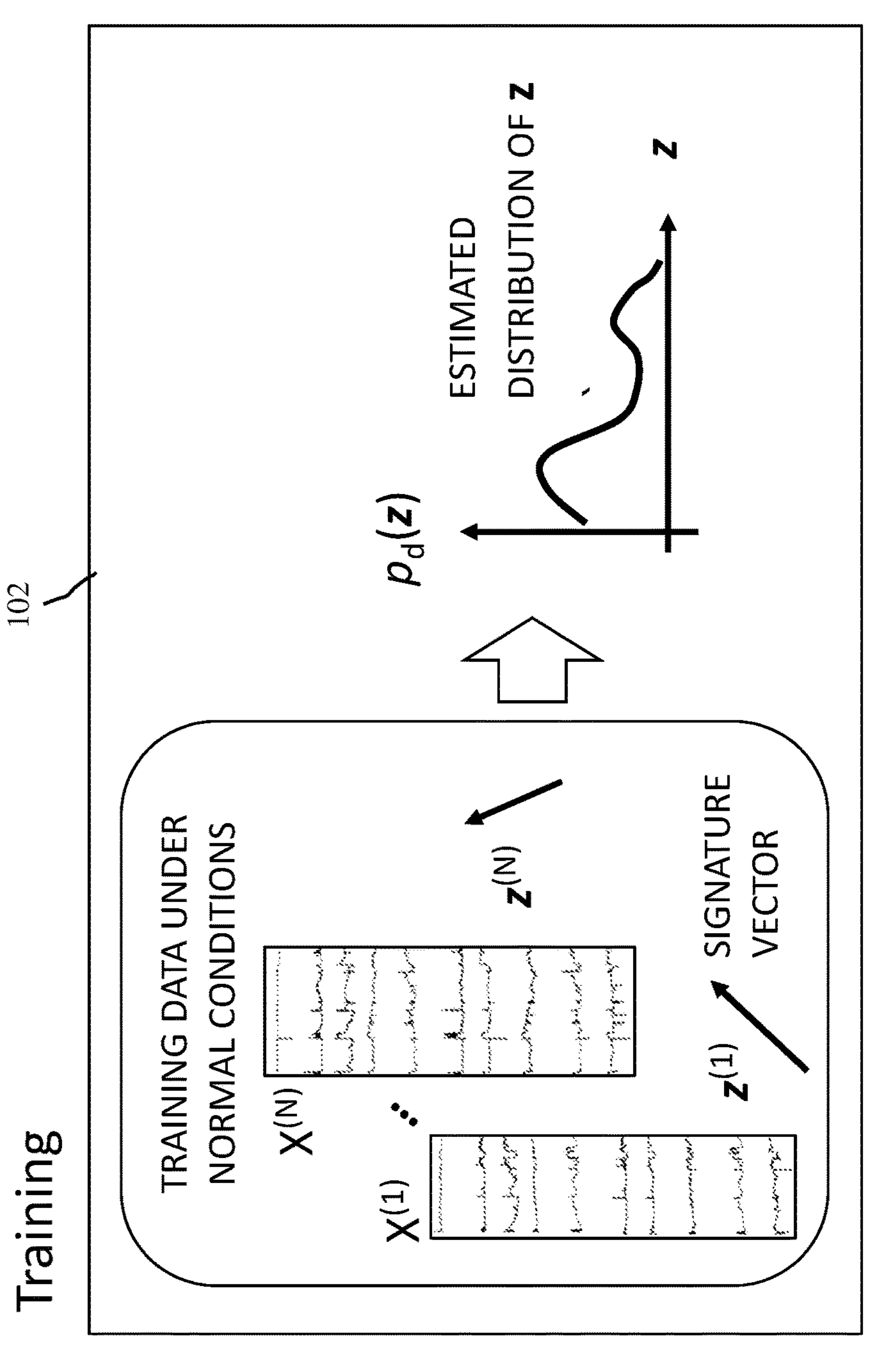
FIG. 1 and FIG. 2 illustrate an overview for anomaly detection in an embodiment.

A system and method can be provided for detecting anomaly in industrial process and/or equipment. In one or more embodiments, the system and/or method can detect anomaly in time series data from a sensor network of an industrial process, for example, in an industrial dynamic system. In one or more embodiments, the system and/or method can address an unsupervised anomaly detection problem where labeled data are not available, scarcely available, and/or the number of anomalies is only a very small fraction of the data set. In an aspect, an unsupervised anomaly detection method for a time series problem can use deep learning techniques. For example, an embedding network can be trained to extract a low dimensional representation from a time series data. A contrastive density learning method can be used to learn the probability distribution of the embedding by using an artificial neural network. By using the trained neural network, the probability of a new event can be computed, and an anomaly score can be computed directly from the probability of the new event. In an aspect, the method can be relatively parameter free and can be applied to one or more problem having higher dimensions.

In an embodiment, a training phase of a machine learning anomaly detection model can use multivariate time series data that may include noise from one or more sensor networks. The data can be obtained from one machine or a cohort of machines for a unit process. A time series, e.g., includes a series of data over a number of time steps. A time series data can be multivariate, e.g., includes a number of features or variables. A monitoring or inference phase can use streaming data from the one or more sensor networks.

In an embodiment, the system and/or method can include an embedding component or step, and an anomaly scoring component or step. In the embedding component or step, given a set of time-series data from a manufacturing process, the system and/or method can learn a mapping function that maps a time-series data onto a vector representation. In the anomaly scoring component or step, the system and/or method can, given a new time-series data from an industrial process, compute a numerical value that quantifies the degree of anomalousness or anomaly.

The system and/or method can be used or applied in various industrial processes or system. For example, the system and/or method can detect anomalies in temperature and/or pressure of a blast furnace, bearing vibration and/or speed of a wind turbine, and/or others such as but not limited to anomalies occurring in manufacturing and process industries, finance, information technology and/or medical systems and/or equipment. By way of another example, the system and/or method can be used in off-shore oil rig monitoring, for example, to detect early failure in compressors of off-shore oil rigs. In this example, the data to train a machine learning anomaly detection model can include sensor signals or data from physical sensors attached on a compressor. The system and/or method can perform unsupervised anomaly monitoring, including computing a numerical score representing the degree of anomalousness for a time-series window and estimating the probability density, where a low probability event can signal an anomaly. For instance, under a normal condition, an anomalous occurrence should be rare, e.g., the probability of the anomalous occurrence should be low. Yet another example of detecting anomaly can be detecting an unusual occupancy event in a building, e.g., unusually high number of occupancy in a building.

Figure 2:
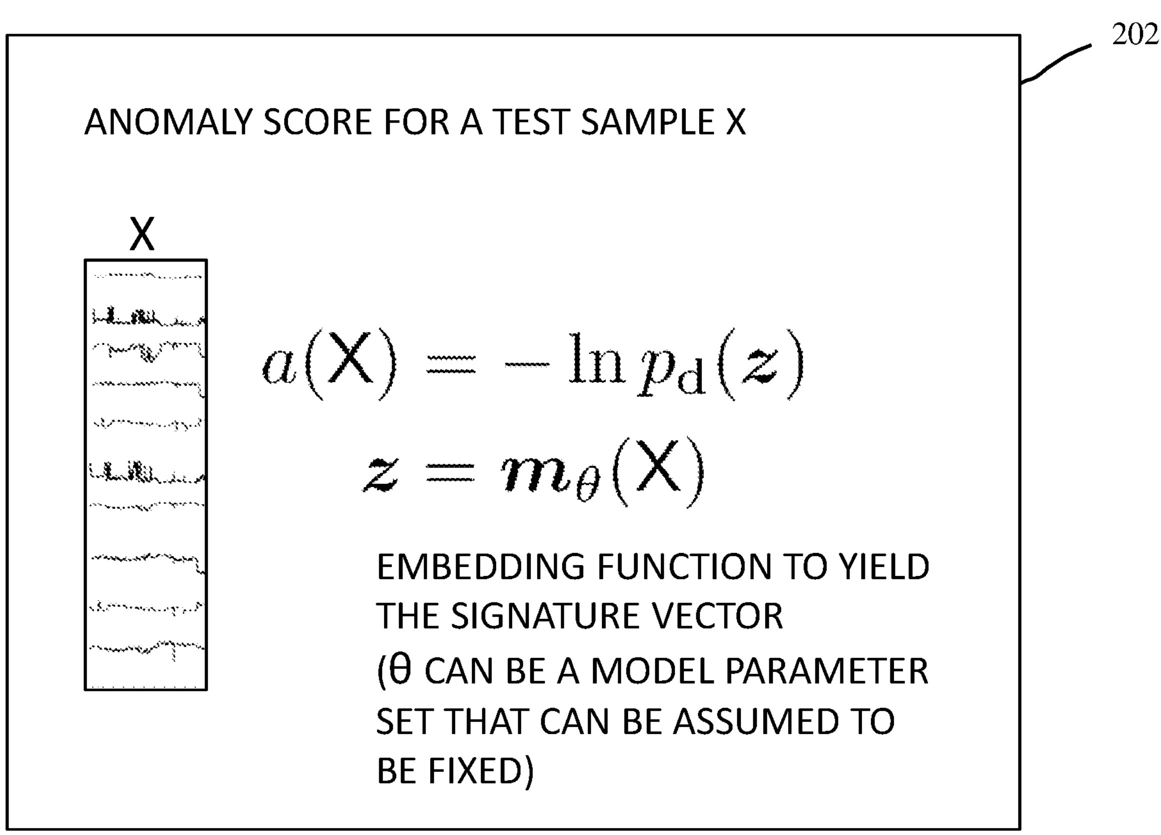
Figure 3:
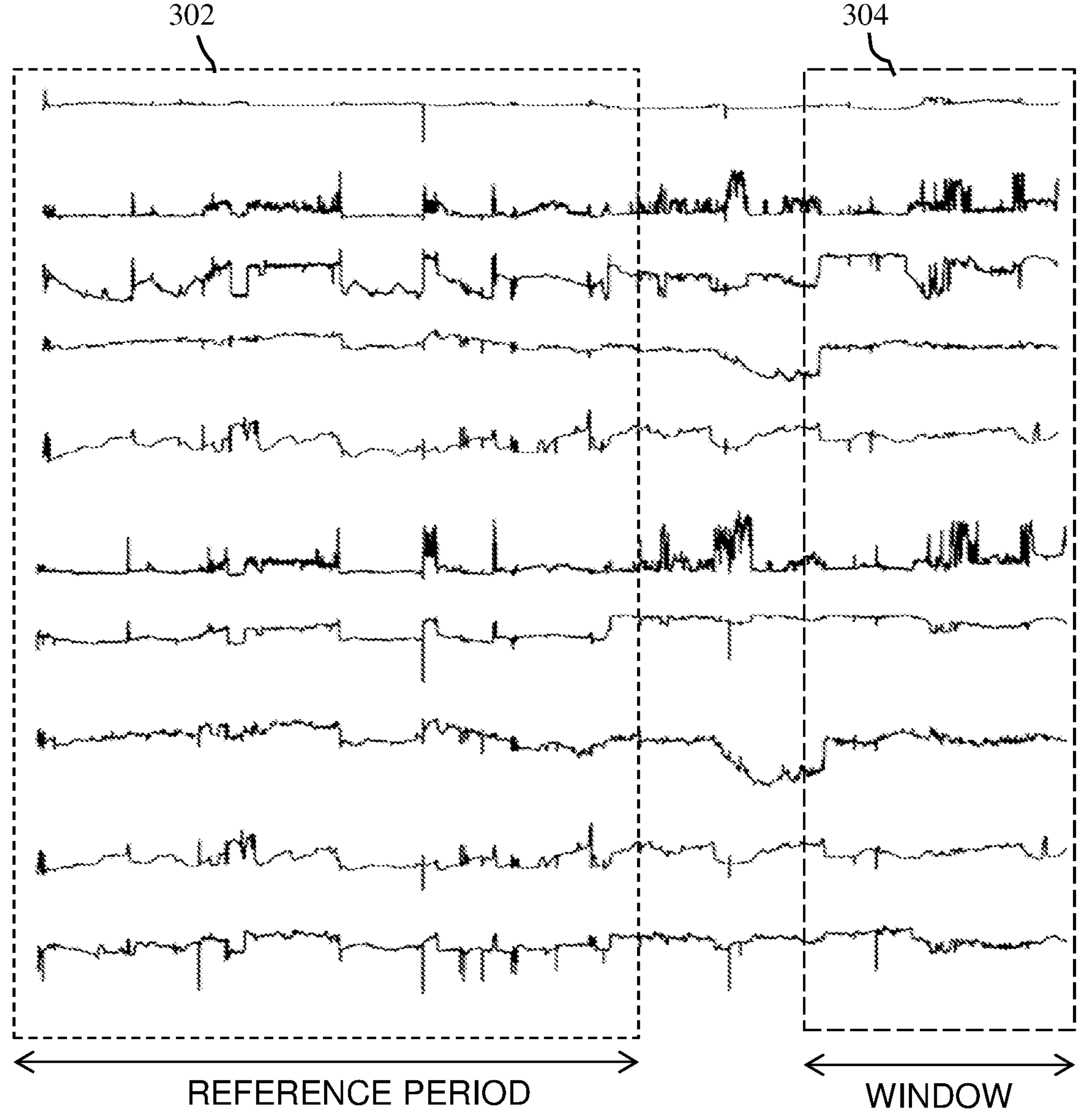
FIG. 3 shows example time series data in an embodiment.

FIG. 1 and FIG. 2 illustrate an overview for anomaly detection in an embodiment. FIG. 3 shows example time series data in an embodiment. The times series data can represent sensor data from oil rig equipment such as a compressor detected over time. By way of example, data obtained over time 302 can be used to train a neural network for learning probability density. Given a time series data occurring in a time window 304, the trained neural network can be used to detect anomaly in the new time series data.

In an embodiment, the system and/or method may use a new deep density estimation approach combined with deep time-series embedding. Training 102 (FIG. 1) can include receiving N number of time series data, $X^{(1)} \ldots X^{(N)}$. For example, $X^{(1)}$ can be times series data of an industrial process, e.g., sensor data in a time frame (e.g., a window of time), and there can be N such time series data. Such data can be data from a dynamic industrial process, e.g., running under normal conditions. Time series data, e.g., $X^{(1)}$ can be transformed into a signature vector $z^{(1)}$, using an embedding function to summarize one time series into one vector. For example, each time series data, e.g., $X^{(1)} \ldots X^{(N)}$, is transformed into a signature vector, $z^{(1)} \ldots z^{(N)}$. In an embodiment, the signature vectors, $z^{(1)} \ldots z^{(N)}$, are used to train a neural network model, to learn a function for estimating a probability density distribution. For instance, a deep learning model can be trained that can identify the probability distribution of the latent vector z.

Testing or inference 202 (FIG. 2) can include receiving a new time series data X, using an embedding function to transform the new time series data X to a signature vector z. The signature vector is z can be input to the trained neural network for determining the probability of occurrence of the new time series data X. Anomaly score can be computed based on the probability output by the trained neural network. For instance, at test time, given a new time series data (e.g., streaming data from sensors), the system and/or method can apply the embedding function to compute latent vector z. $P_d$ can be a model that can compute the probability of this occurrence. Using z as input to $P_d$, the system and/or method can apply a logarithmic function, which determines the likelihood of z event. A threshold value can be applied based on this likelihood, to determine whether z is anomalous. For instance, if the likelihood of z exceeds a given threshold, it can be determined that there is anomaly in z.

In an embodiment, the input used in training phase of the methodology can include training data set $\{(X^{(n)}, z^{(n)}|n=1, \ldots, N\}$, proposal distribution $p_g(z)$, which can be uniform, and N samples from $p_g(z)$, each sample denoted by $\{\zeta^{(n)}\}$. In embodiment, $X^{(n)}$ can be a time series data from an industrial process. In an embodiment, $z^{(n)}$ can be obtained using an embedding function that transforms time series $X^{(n)}$, into a latent variable space. Such latent variable space can be a relatively low dimensional space.

The system and/or method can use contrastive latent density learning, a density estimation procedure disclosed herein in an embodiment, which provides the density in the "contrastive" form $$p_d(z) = p_g(z)\frac{D_\phi(z)}{1 - D_\phi(z)}.$$

In an embodiment, function $D_\phi(z)$ can be given by a deep neural network whose network weights are determined via $$\phi = \operatorname{argmax} \sum_{n=1}^{N} \{\ln D_\phi(z^{(n)}) + \ln[1 - D_\phi(\zeta^{(n)})]\}.$$

For example, given the input training data $X^{(n)}$, which can be transformed into $z^{(n)}$ using an embedding function, and proposal distribution $p_g$ (e.g., uniform distribution or another known distribution), or $p_g(z)$ representing signature vectors z with the proposal distribution, from which data can be sampled (e.g., denoted by zeta ($\zeta^{(n)}$)), the system and/or method in an embodiment can compute the probability distribution. The system and/or method can train the neural network ($D_\phi$), e.g., by solving an optimization problem with respect to the random variable zeta obtained from the proposal distribution. Solving the optimization problem updates the weights of the neural network $D_\phi$.

In an embodiment, the system and/or method may determine an anomaly score from the latent variable space, z. For instance, the system and/or method need not use anomaly labels, but can assume that anomaly is a low probability event and detect anomaly based on observing the probability of the system state in the latent variable space (also referred to as an embedded space). The system and/or method may identify the probability of the occurrence of the system state in the embedded space.

In an embodiment, in contrastive density learning, probability density is learned by comparing the occurrence of data to the occurrence of the samples from a test probability distribution. In an embodiment, the conventional generative adversarial training method can be reformulated for the contrastive density learning. In an embodiment, the model does not have a tuning parameter, such as the kernel width in the kernel density estimation.

Algorithm 1 illustrates an example of training in an embodiment.

| Algorithm: Training |
| --- |
| Input<br>Time series data: $X = (Y_{1:T}, U_{1:T})$<br>Embedding function: $z = q(Y, U)$<br>Generator distribution $p_g(z)$, which can be normal, or uniform distribution, or another known distribution<br>Model Training<br>While (n_iteration < max_iteration):<br>1. random sampling $(Y_{1:t}, U_{1:t})$ from X<br>2. compute embedding: $z_d = q(Y_{1:t}, U_{1:t})$<br>3. compute loss function: $L_1 = \log D(z_d)$<br>4. draw a random sample from $p_g(z)$: $z_g \sim p_g(z)$<br>5. compute a loss function: $L_2 = \log[1-D(z_g)]$<br>6. compute the gradient of D(z) with respect to the total loss $L=L_1+L_2$<br>7. update the parameters of D(z) by using a stochastic gradient descent (SGD) |

Referring to Algorithm 1, the sensor data is denoted by Y and corresponding control variables are denoted by U. Sensor data $Y_{1:T}$, for example, from time 1 to time T, and corresponding control variable data $U_{1:T}$, for example, from time 1 to time T can be received. Random sampling, $(Y_{1:t}, U_{1:t})$, can include a time series data of a subset time length from time 1 to time T, for example, any sliding time window between time 1 and time T. Examples of sensor data Y can include temperature, pressure, other data detected by one or more sensors; examples of control variable data U can include amount of cooler, water, catalyst, other material used or injected in an industrial process, which can control the values of the sensor data Y. Time series data received for training can include both sensor data and control variable data. Embedding function q can be received as input, using which the time series data can be transformed to vectors in a latent space. Examples of an embedding function can include but are not limited to neural network, e.g., recurrent neural network, variational autoencoder. The embedding function transforms a time series data X, into one point in the embedded space, denoted by z. Drawing a random sample from $p_g(z)$: $z_g \sim p_g(z)$, selects data from a dataset z having the proposal probability (also referred to here as the generator distribution). In an aspect, the neural network can be trained using an optimization which solves the loss function. In an embodiment, the neural network can be a feedforward neural network with an activation function such as a sigmoid function. By way of example, the neural network can be trained using a stochastic gradient descent, e.g., using mini-batches, and using adaptive learning rate optimization algorithm (ADAM). Other hyperparameters of the neural network can be configurable.

Algorithm 2 illustrates an example of testing or inference phase using the trained neural network in an embodiment.

| Algorithm: Monitoring |
| --- |
| Input<br>Streaming data: $Y_t$, $U_t$<br>Embedding function: $z = q(Y, U)$<br>Generator distribution $p_g(z)$<br>Trained neural network: D(z)<br>Threshold: $\kappa$<br>Anomaly detection monitoring<br>1. receive a new sensor data: $Y_t$, $U_t$<br>2. append $(Y_t, U_t)$ to the stored time series data => $X = (Y_{t-n:t}, U_{t-n:t})$<br>3. compute embedding: $z = q(X)$<br>4. compute the neural network score: $d = D(z)$<br>5. compute the generator probability: $g = p_g(z)$ |

-continued

| Algorithm: Monitoring |
| --- |
| 6. compute the anomaly score (e.g., negative log likelihood): $s = -\log(g) - \log(d) + \log(1-d)$ |
| 7. if ($s > \kappa$) : report anomaly |
| 8. else : go to step 1. |

In an embodiment, threshold κ can be configured or predetermined, and represents the probability that can be tolerated, e.g., a probability threshold. In an embodiment, κ can be a log of probability. In an embodiment, density-estimation-based approaches can be practical as they can handle the uncertainty of the anomaly score.

In one or more embodiments, the system and/or method disclosed herein can detect anomaly in industrial dynamic systems using unsupervised machine learning. For instance, the system and/or method can implement a density estimation technique to learn the underlying distribution on normal data, and also can implement an anomaly scoring function to test unknown data for anomalies. In an embodiment, the system and/or method can include a distribution learning and an anomaly scoring function. The distribution learning in an embodiment can include learning an embedding of the input multivariate time series using deep learning. The distribution learning can also include learning a neural network by contrasting random samples from the data with random samples from a generator distribution. The distribution learning can further include updating parameters of the neural network based on the contrastive loss function and estimating probability density using the learned embedding as input. The anomaly scoring in an embodiment can include computing an embedding for a new data. The anomaly scoring can also include computing a neural network score using the embedded value and a generator probability distribution. The anomaly scoring can also include computing the anomaly score using the neural network score and generator probability.

Figure 4:
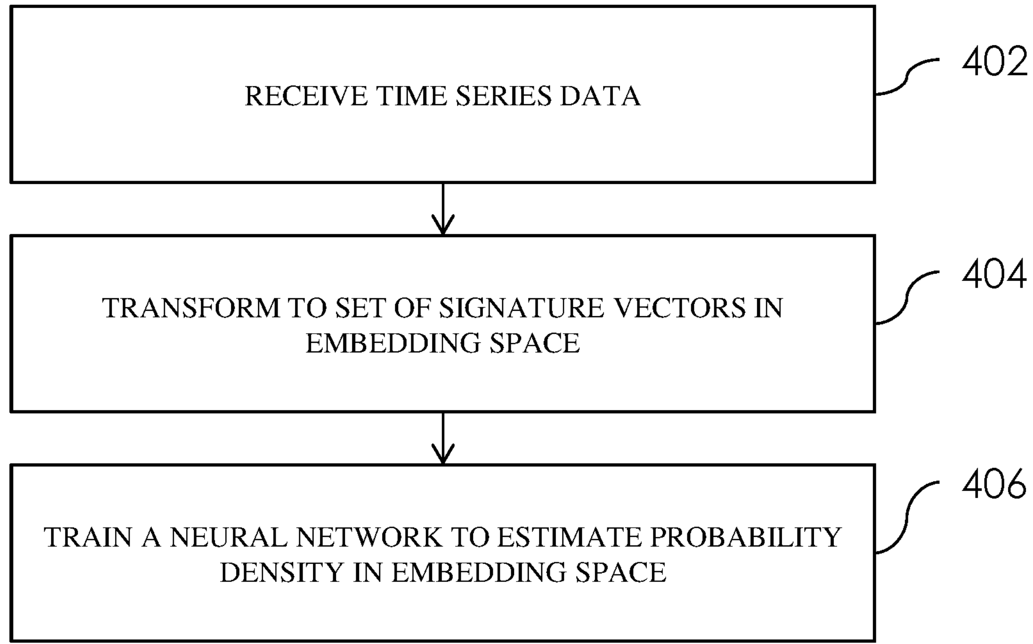
FIG. 4 is a flow diagram illustrating training of a machine learning model for detecting anomaly in an industrial process.

FIG. 4 is a flow diagram illustrating a method of training a machine learning model to detect anomaly in an industrial process in an embodiment. The method can be implemented or run by one or more computer processors, for example, including one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 402, time series data is received. For instance, the time series data can be a set of multivariate time series data representing sensor data or sensor signals obtained over time, for example, in an industrial process.

At 404, the set of multivariate time series data is transformed into a set of signature vectors in an embedding space. For instance, each of the time series data in the set can be transformed into a signature vector. In an embodiment, an embedding function or model learned via deep learning can be used or run to transform a time series (e.g., a series of sensor data obtained over time) into a signature vector. For instance, in an embodiment, each multivariate time series can be transformed into a signature vector. In an embodiment, deep learning or the model can include a recurrent neural network. In another embodiment, deep learning or the model can include an autoencoder. Any other deep learning technique or models can be used. In an embodiment, the embedding function or model can be given.

At 406, a neural network can be trained to estimate a probability distribution of the set of signature vectors in the embedding space. In an embodiment, the neural network can be trained by contrasting random samples from the set of signature vectors with random samples from a given distribution and updating weights of the neural network using a loss function based on the contrasting. The given distribution, for example, is specified or configured, and can be uniform distribution, normal distribution, and/or another distribution.

Figure 5:
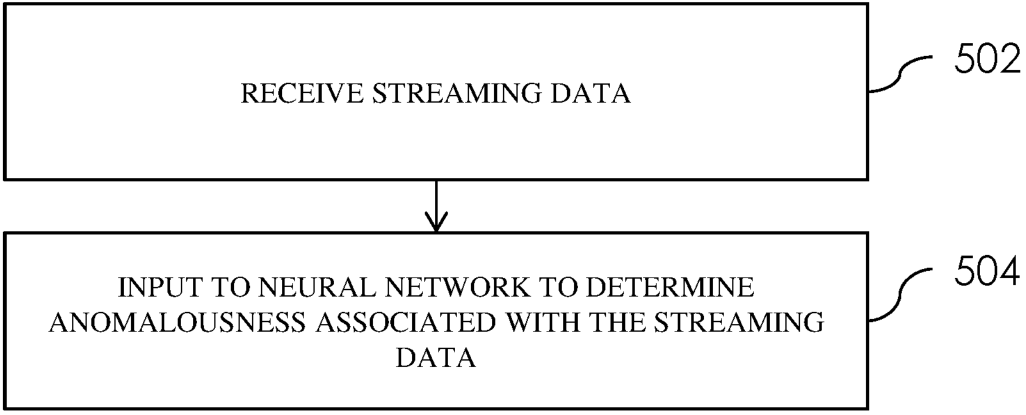
FIG. 5 is a flow diagram illustrating detecting anomaly in an industrial process in an embodiment.

FIG. 5 is a flow diagram illustrating a method of monitoring or detecting anomaly in an industrial process in an embodiment. The method of monitoring or detecting anomaly can use the trained neural network, e.g., trained as described with reference to FIG. 4. At 502, streaming data, for example, new sensor data, which can be multivariate data representing sensor data from an industrial process can be received. In an embodiment, the streaming data can be multivariate sensor data occurring at time t, e.g., current time t.

At 504, based on the trained neural network, anomaly score for the streaming data can be determined. For instance, the streaming data of time t can be appended with a previously stored time series data, for example, time series data occurring to prior to the streaming data, e.g., n times units prior to time t, such that a time series data of a time window, e.g., t−n to t, can be created with the streaming data. The length of the time window can be preconfigured. The appended streaming data (e.g., a time series data including new sensor data) can be transformed into an embedding, for example, using an embedding function or model such as, but not limited to, a recurrent neural network, an autoencoder, or another deep learning model. The embedding can be input into the trained neural network, the trained neural network outputting a first probability distribution score. A second probability distribution score associated with the embedding can be determined based on a given proposed probability distribution. The given proposed probability distribution can be uniform distribution, normal distribution, or another. Anomaly score be determined based on the first probability distribution score and the second probability distribution score. In an embodiment, the anomaly score can be compared with a given threshold value, and based on the comparison of the anomaly score with the given threshold value, anomalousness of the streaming data can be determined. For instance, if the anomaly score exceeds the given threshold value, an alert can be generated to indicate an anomaly.

In another embodiment, the streaming data can include a new time series data of a time window, for example, such that the appending of the new time series data can be skipped, and the embedding can be performed on the received new time series data.

Figure 6:
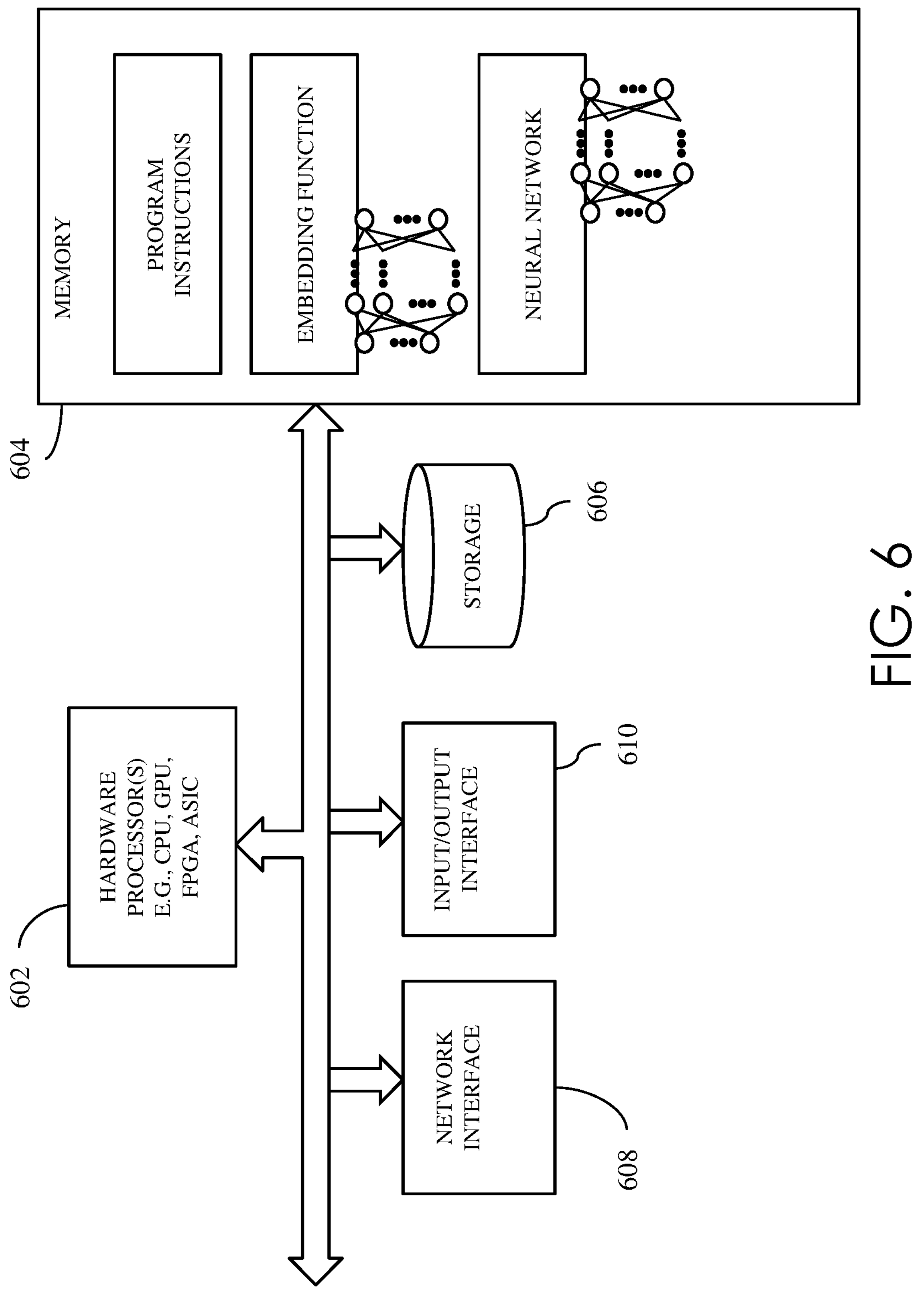
FIG. 6 is a diagram showing components of a system in one embodiment that can detect anomaly in industrial process in an embodiment.

FIG. 6 is a diagram showing components of a system in one embodiment that can detect anomaly in industrial process in an embodiment. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate and/or train an anomaly detection model based on training data including times series data, and/or monitor and/or detect anomaly in a new or given time series data. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including a set of multivariate time series data representative of sensor data obtained over time, transform the set of multivariate time series data into a set of signature vectors in an embedding space, and train a neural network to estimate a probability distribution of the set of signature vectors in the embedding space. In one aspect, the multivariate time series data may be stored in a storage device 606 or received via a network interface 608 from a remote device, and may be temporarily loaded into a memory device 604 for generating or training a neural network. The learned neural network model may be stored on a memory device 604, for example, for running by one or more hardware processors 602, for example, to detect anomaly in incoming streaming data. in an aspect, one or more hardware processors 602 that train the neural network can be different from one or more hardware processors that use the trained neural network to detect anomaly. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
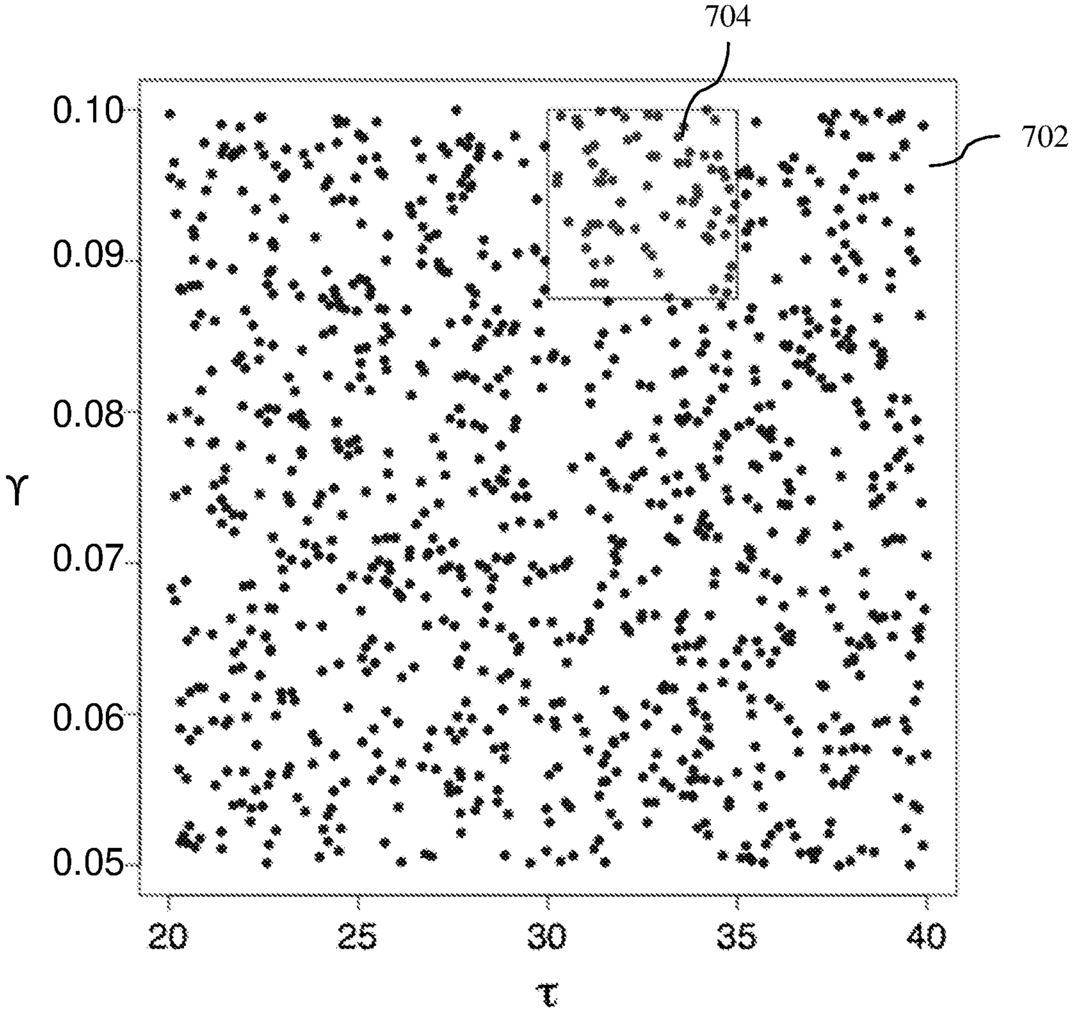
FIG. 7 is a diagram showing an example embedding space including signature vectors in an embodiment.

FIG. 7 is a diagram showing an example embedding space including signature vectors in an embodiment. A time series data can be represented as a signature vector (e.g., a point) in the embedding space of parameters $(\gamma,\tau)$, for example, in an embodiment. Consider that a neural network is trained based on signature vectors representing time series data of an industrial process under normal conditions, shown at 702, without the signature vectors shown in 704. Given a new time series data, which can be represented by one of the points shown in 704, the system and/or method in an embodiment may detect that the new time series data indicates anomaly in the industrial process.

Figure 8:
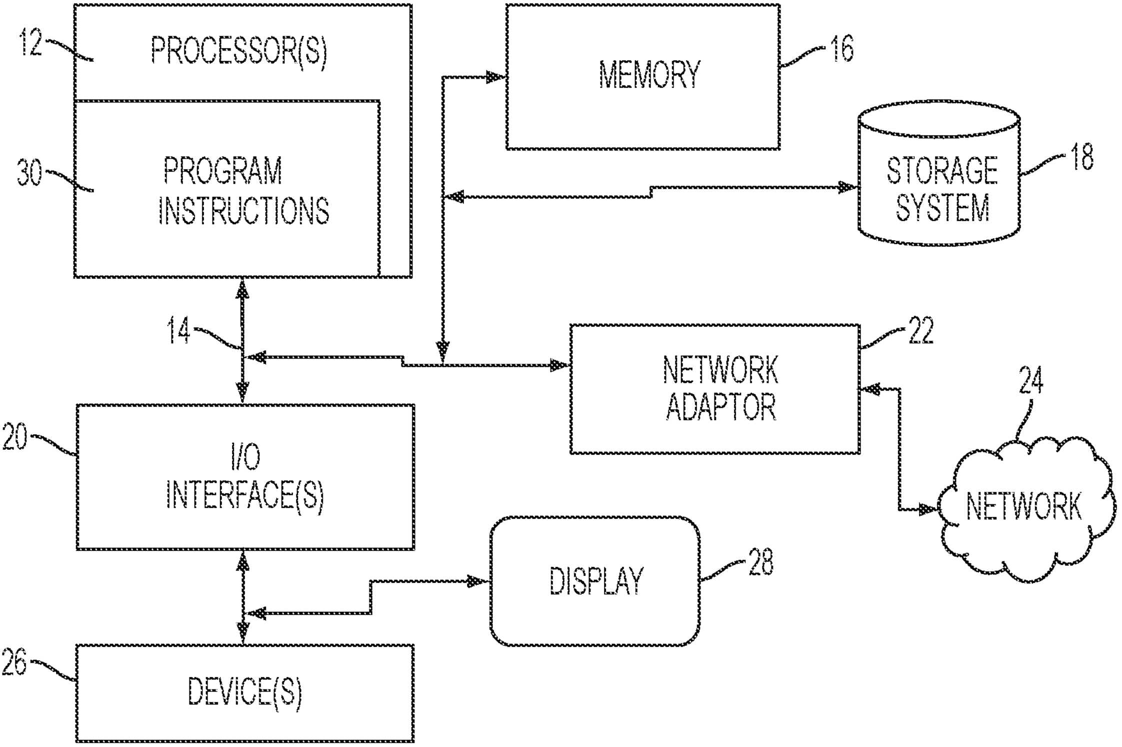
FIG. 8 illustrates a schematic of an example computer or processing system that may implement a system according to one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
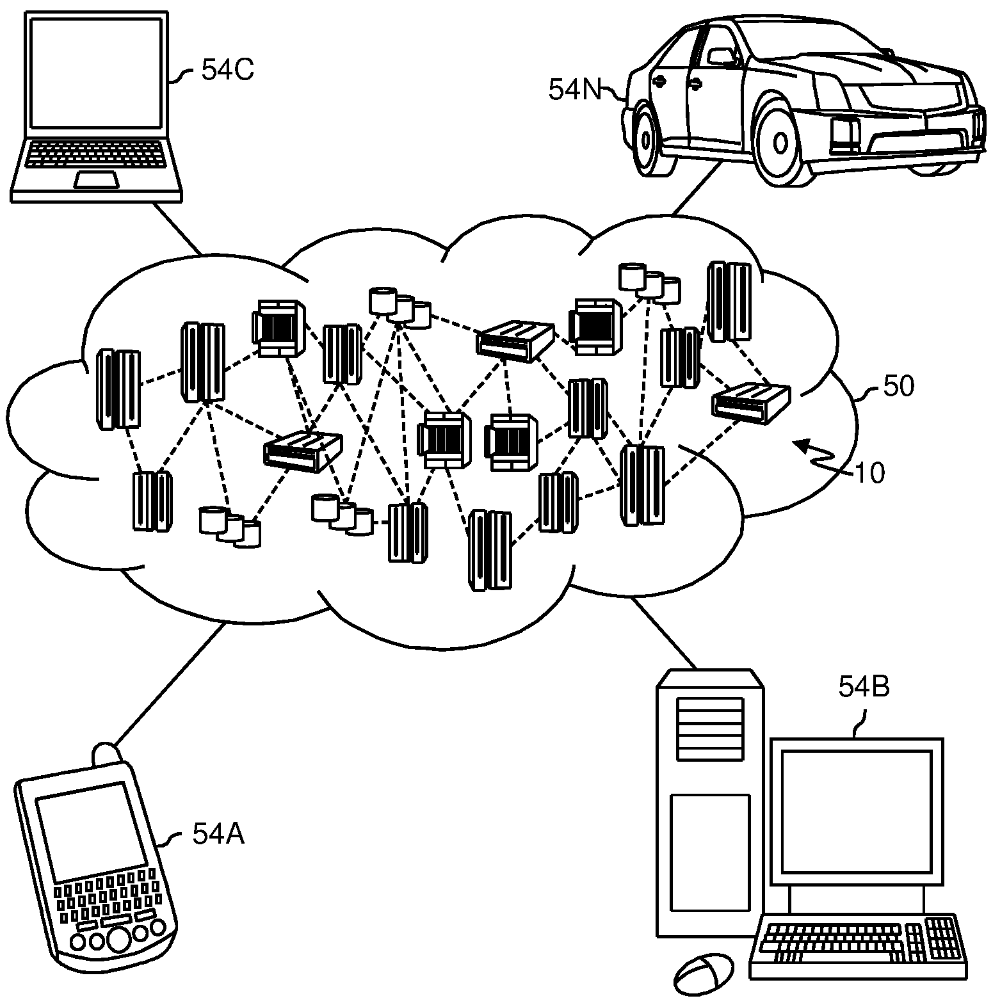
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
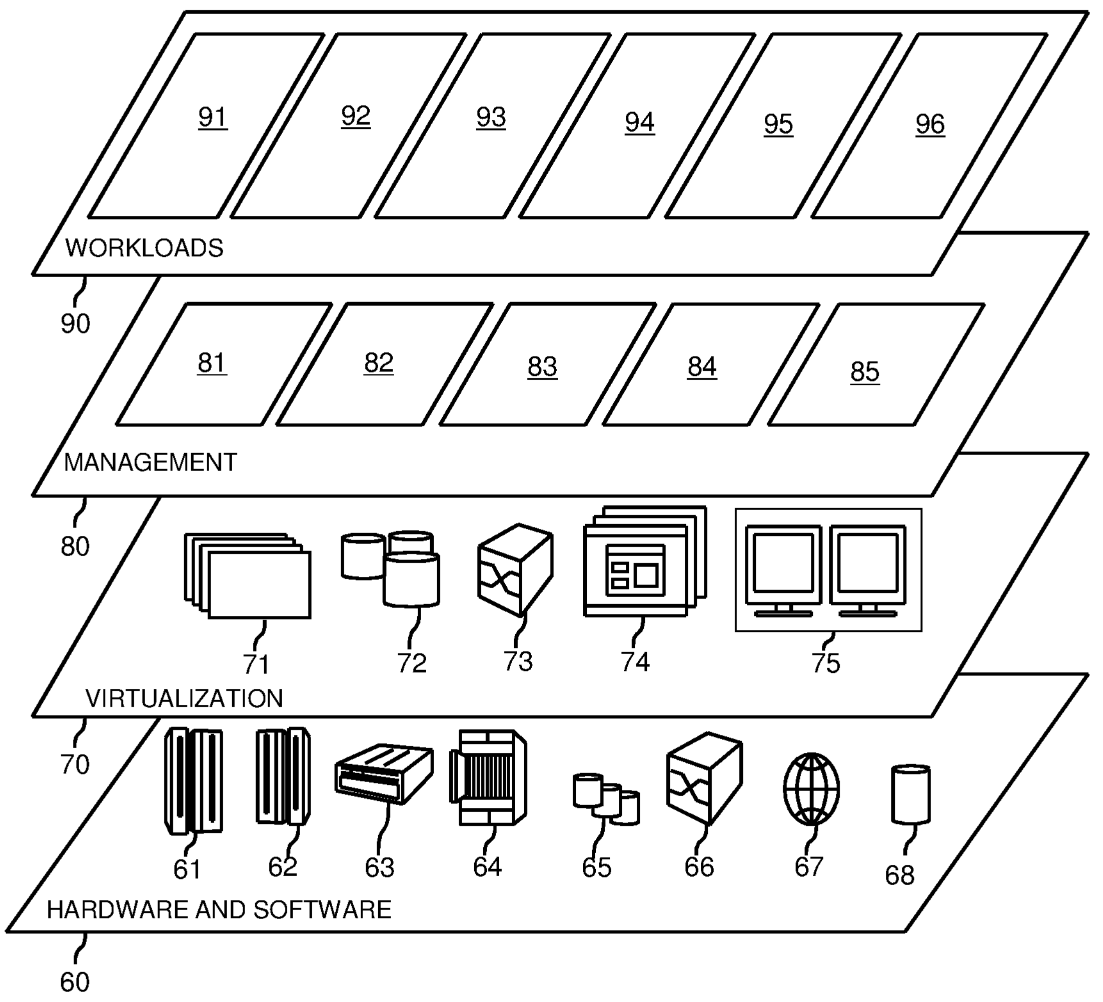
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of detecting anomaly in an industrial process, comprising:

receiving a set of multivariate time series data representative of sensor data obtained over time;

transforming the set of multivariate time series data into a set of signature vectors in an embedding space, the set of multivariate time series data being an unlabeled data set;

training a neural network to estimate a probability distribution of the set of signature vectors in the embedding space, the training using the set of signature vectors transformed from the unlabeled data set, wherein the neural network is trained by contrasting random samples from the set of signature vectors with random samples from a given distribution and updating weights of the neural network based on the contrasting, wherein input for training of the neural network includes at least the set of multivariate time series data and the given distribution, the set of multivariate time series data including the sensor data and corresponding control variable data, the given distribution being configurable, wherein the contrasting random samples from the set of signature vectors with random samples from a given distribution includes:

sampling a signature vector randomly and passing the randomly sampled signature vector to the neural network;

computing a loss function of the randomly sampled signature vector passed to the neural network;

sampling a random sample from the given distribution and passing the random sample from the given distribution to the neural network; and computing a loss function of the random sample from the given distribution passed to the neural network;

wherein the updating the weights of the neural network based on the contrasting includes updating the weights of the neural network using a total loss, the total loss being a sum of the loss function of the randomly sampled signature vector passed to the neural network and the loss function of the random sample from the given distribution passed to the neural network.

2. The method of claim 1, wherein the set of multivariate time series data is transformed into the set of signature vectors by learning an embedding function using deep learning.

3. The method of claim 1, further including receiving streaming data and based on the trained neural network, determining an anomaly score in the streaming data.

4. The method of claim 1, further including:
receiving streaming data;
appending the streaming data with a previously stored time series data;
transforming the appended streaming data into an embedding;
inputting the embedding into the trained neural network, the trained neural network outputting a first probability distribution score;
determining a second probability distribution score associated with the embedding based on a given proposed probability distribution;
determining an anomaly score based on the first probability distribution score and the second probability distribution score.

5. The method of claim 4, further including:
comparing the anomaly score with a given threshold value; and
based on the comparison of the anomaly score with the given threshold value, determining anomalousness of the streaming data.

6. A system comprising:
a processor; and
a memory device coupled with the processor;
the processor configured to at least:
receive a set of multivariate time series data representative of sensor data obtained over time;
transform the set of multivariate time series data into a set of signature vectors in an embedding space, the set of multivariate time series data being an unlabeled data set;
train a neural network to estimate a probability distribution of the set of signature vectors in the embedding space, the training using the set of signature vectors transformed from the unlabeled data set,
wherein the neural network is trained by contrasting random samples from the set of signature vectors with random samples from a given distribution and updating weights of the neural network based on the contrasting, wherein input for training of the neural network includes at least the set of multivariate time series data and the given distribution, the set of multivariate time series data including the sensor data and corresponding control variable data, the given distribution being configurable, wherein the contrasting random samples from the set of signature vectors with random samples from a given distribution includes:
sampling a signature vector randomly and passing the randomly sampled signature vector to the neural network;
computing a loss function of the randomly sampled signature vector passed to the neural network;
sampling a random sample from the given distribution and passing the random sample from the given distribution to the neural network; and
computing a loss function of the random sample from the given distribution passed to the neural network;
wherein the updating the weights of the neural network based on the contrasting includes updating the weights of the neural network using a total loss, the total loss being a sum of the loss function of the randomly sampled signature vector passed to the neural network and the loss function of the random sample from the given distribution passed to the neural network.

7. The system of claim 6, wherein the processor is configured to transform the set of multivariate time series data into the set of signature vectors by learning an embedding function using deep learning.

8. The system of claim 7, wherein the deep learning includes a recurrent neural network.

9. The system of claim 7, wherein the deep learning includes an autoencoder.

10. The system of claim 6, wherein the processor is further configured to receive a streaming data and based on the trained neural network, determine an anomaly score in the streaming data.

11. The system of claim 6, wherein the processor is further configured to:
receive streaming data;
append the streaming data with a previously stored time series data;
transform the appended streaming data into an embedding;
input the embedding into the trained neural network, the trained neural network outputting a first probability distribution score;
determine a second probability distribution score associated with the embedding based on a given proposed probability distribution;
determine an anomaly score based on the first probability distribution score and the second probability distribution score.

12. The system of claim 11, wherein the processor is further configured to:
compare the anomaly score with a given threshold value; and
based on the comparison of the anomaly score with the given threshold value, determine anomalousness of the streaming data.

13. A computer program product comprising a non-transitory computer readable storage medium having program instructions embodied therewith, the program instructions readable by a device to cause the device to:
receive a set of multivariate time series data representative of sensor data obtained over time;
transform the set of multivariate time series data into a set of signature vectors in an embedding space, the set of multivariate time series data being an unlabeled data set;
train a neural network to estimate a probability distribution of the set of signature vectors in the embedding space, training the neural network using the set of signature vectors transformed from the unlabeled data set,
wherein the neural network is trained by contrasting random samples from the set of signature vectors with random samples from a given distribution and updating weights of the neural network based on the contrasting, wherein input for training of the neural network includes at least the set of multivariate time series data and the given distribution, the set of multivariate time series data including the sensor data and corresponding control variable data, the given distribution being configurable, wherein the contrasting random samples from the set of signature vectors with random samples from a given distribution includes:
sampling a signature vector randomly and passing the randomly sampled signature vector to the neural network;
computing a loss function of the randomly sampled signature vector passed to the neural network;

sampling a random sample from the given distribution and passing the random sample from the given distribution to the neural network; and computing a loss function of the random sample from the given distribution passed to the neural network;

wherein the updating the weights of the neural network based on the contrasting includes updating the weights of the neural network using a total loss, the total loss being a sum of the loss function of the randomly sampled signature vector passed to the neural network and the loss function of the random sample from the given distribution passed to the neural network.

14. The computer program product of claim 13, wherein the device is caused to transform the set of multivariate time series data into the set of signature vectors by learning an embedding function using deep learning.

15. The computer program product of claim 13, wherein the device is further caused to receive streaming data and based on the trained neural network, determine an anomaly score in the streaming data.

16. The computer program product of claim 13, wherein the device is further caused to:

receive streaming data;

append the streaming data with a previously stored time series data;

transform the appended streaming data into an embedding;

input the embedding into the trained neural network, the trained neural network outputting a first probability distribution score;

determine a second probability distribution score associated with the embedding based on a given proposed probability distribution;

determine an anomaly score based on the first probability distribution score and the second probability distribution score.

17. The computer program product of claim 16, wherein device is further caused to:

compare the anomaly score with a given threshold value; and based on the comparison of the anomaly score with the given threshold value, determine anomalousness of the streaming data.

* * * * *